May 23, 1961 — J. M. TOTH — 2,985,035
DIFFERENTIAL MECHANISMS
Filed July 18, 1958 — 2 Sheets-Sheet 1

Inventor
John Michael Toth
By Slough & Slough
Attorney

May 23, 1961 J. M. TOTH 2,985,035
DIFFERENTIAL MECHANISMS
Filed July 18, 1958 2 Sheets-Sheet 2
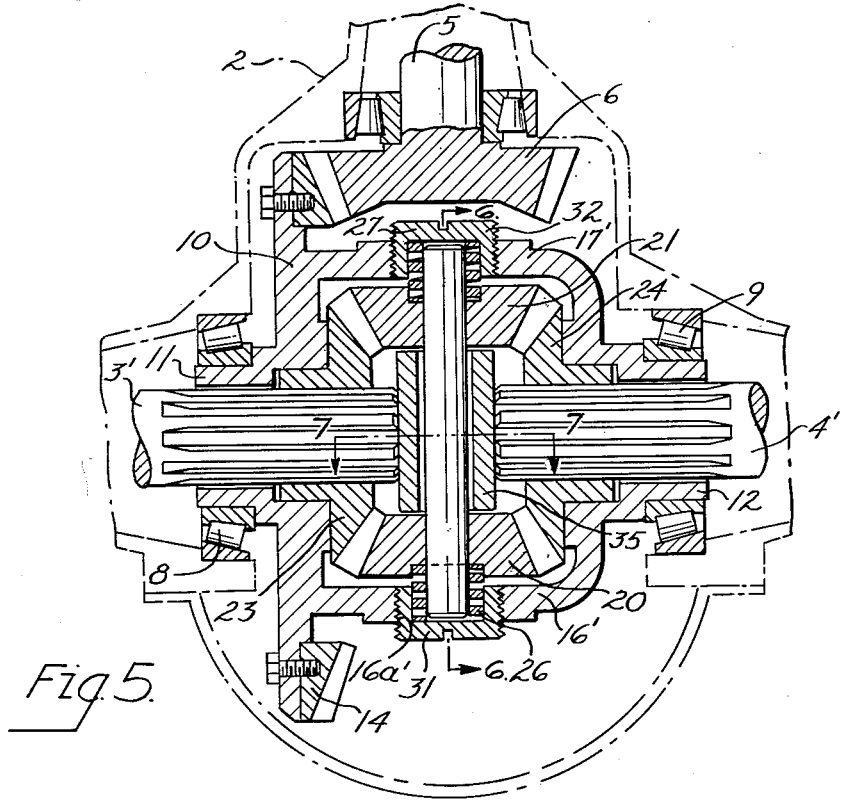
Fig. 5.
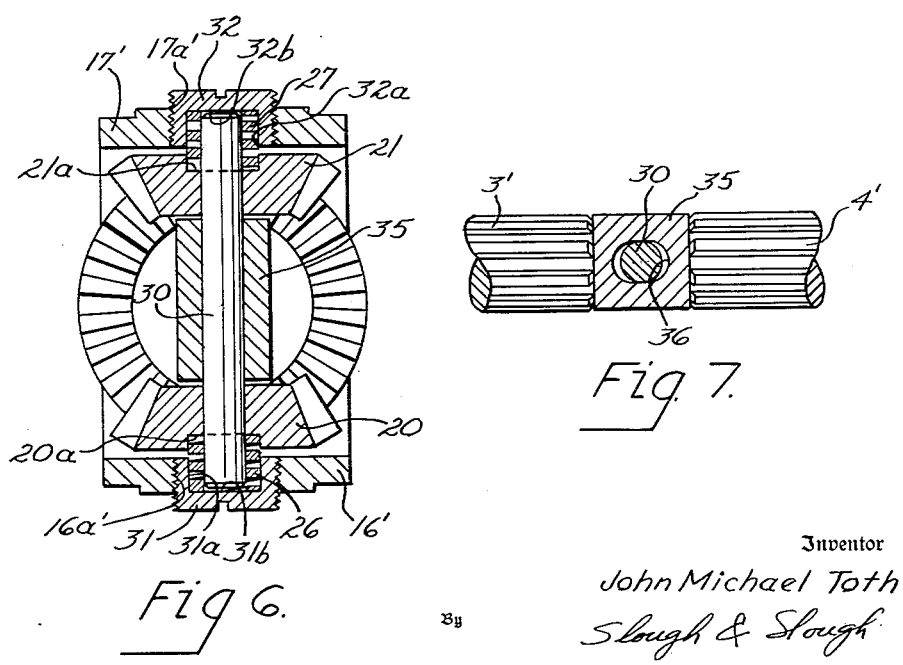
Fig 6.
Fig 7.
Inventor
John Michael Toth
Slough & Slough
Attorney United States Patent Office 2,985,035
Patented May 23, 1961

2,985,035
DIFFERENTIAL MECHANISMS
John Michael Toth, 700 W. 23rd St., Lorain, Ohio
Filed July 18, 1958, Ser. No. 749,352
5 Claims. (Cl. 74—711)

My invention relates to differential mechanisms and relates more particularly to improvements to be added to the differential gears in the driving gear train of motor driven vehicles. This application is a continuation-in-part, undiminished, of an earlier application filed August 20, 1958, having the Serial Number 375,340 and now abandoned.

The conventional differential used in conjunction with driving axles of automotive vehicles is efficient under normal driving conditions as long as the two driving wheels have equal traction. However, when one wheel encounters a slippery surface due to mud or ice, it is commonly known that the wheel having traction will lose all driving power whereas the opposite wheel will spin freely. If the vehicle attempts to accelerate from a standing position under these conditions, it will not move forward under its own power until traction is provided for the slipping wheel. If the vehicle is moving and encounters patches of slippery surface, intermittent loss of traction to either wheel frequently results in dangerous "fishtailing" and general lack of control by the operator.

Under these adverse conditions, it is ordinarily necessary to provide only a small amount of traction to the slipping wheel to enable the vehicle to move from a stopped position or to maintain its stability when traveling. The use of sand, for example, upon the slippery surface will so retard the spinning wheel as to transfer driving torque to the nonspinning wheel. It is not necessary to completely hold the spinning wheel to the speed of the wheel having the better traction. In other words, the differential does not need to be completely locked, but it is necessary to in some way retard the differential action in order to obtain the desired result.

It is an object of my invention to provide an adjustable mechanism for retarding the differential action of differential gearing when one axle is spinning in relation to the other.

Another object of my invention is to provide such a device which will tend to equalize the tractive power delivered to the wheels under all driving conditions.

A further object of my invention is to provide a device as set forth above which is readily adaptable for use with a conventional transmission.

Still another object of my invention is to provide improved means for eliminating the backlash or looseness commonly found in differentials.

Yet another object of my invention is to provide a mechanism of the above type which is composed of but few parts, is inexpensive to manufacture, and is highly efficient in use.

These and other objects of my invention will become readily apparent from the following description and the accompanying drawings, in which said drawings:

Fig. 5 is a view similar to Fig. 1 showing a modification of my improved differential mechanism;

Fig. 6 is a view taken along the line 6—6 of Fig. 5; and

Fig. 7 is a view taken along the line 7—7 of Fig. 5.

Figure 1:
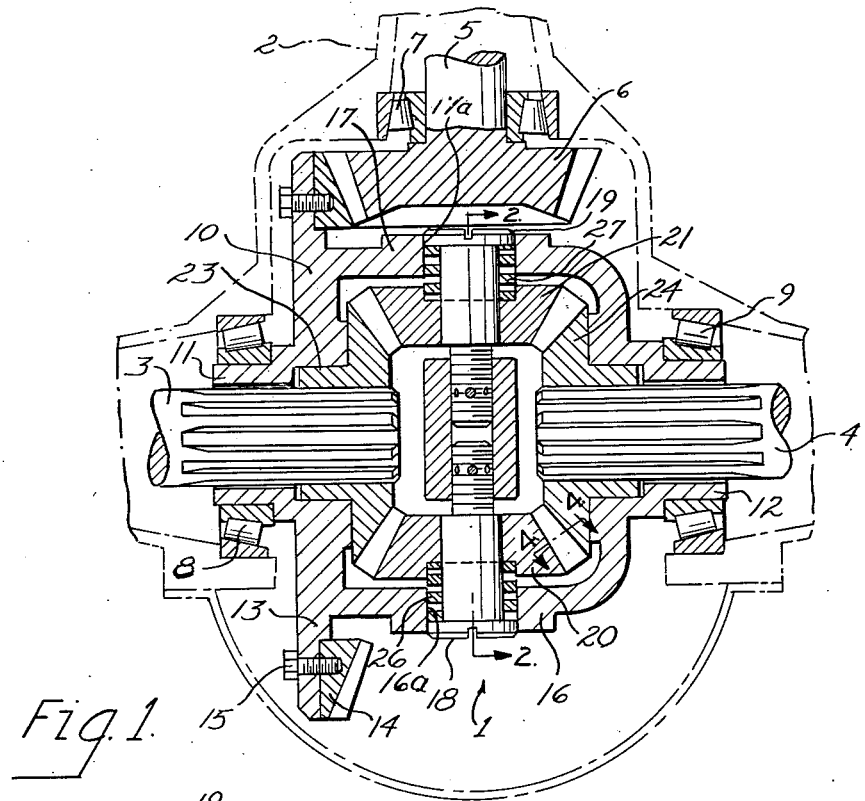
Fig. 1 is a section of my improved differential mechanism taken in the general plane of the axles and drive shaft.

Referring now to the drawings in all of which like parts are designated by like reference characters, at 1 I show, generally, the differential mechanism of my invention completely encased within a rear axle housing cover 2 shown in broken line. It will be understood that the entire differential mechanism and associated parts operate within a suitable lubricant sealed within the cover 2 in a conventional manner commonly found in automotive vehicles.

The differential mechanism 1 is adapted to differentially drive a pair of aligned axle shafts 3 and 4 projecting inwardly of said mechanism from opposite directions, the power source for the driving thereof comprising a drive shaft 5 having secured thereto a drive pinion 6 adapted to rotate with said drive shaft. The drive shaft 5 is mounted for rotation adjacent the differential by means of a bearing 7 of the rear axle housing cover 2.

The differential mechanism 1 comprises a differential housing 10 adapted, by means of aligned, hollow journals 11 and 12, to rotate within bearings 8 and 9 of the rear housing cover 2, the axis of said differential mechanism being at right angles to the axis of the drive shaft 5. The housing 10 has a circumferentially radiating flange 13 upon which is mounted a ring gear 14 secured by bolts 15 or other suitable means. The ring gear 14 meshes with the drive pinion 6 whereby the housing 10 rotates about the bearings 8 and 9.

As herein illustrated, the housing 10 is in the form of a rectangle providing laterally interspaced end walls 16 and 17 positioned parallel with the axis of the axle shafts 3 and 4 and spaced therefrom. The end walls 16 and 17 are apertured at 16a and 17a respectively to provide mounting means for spindles 18 and 19 upon which differential pinions 20 and 21 are rotatably mounted. Intermediate beveled gears 23 and 24 are spined upon the inner ends of the axle shafts 3 and 4 respectively and are adapted to mesh with the differential pinions 20 and 21.

Figures 2, 3, 4:
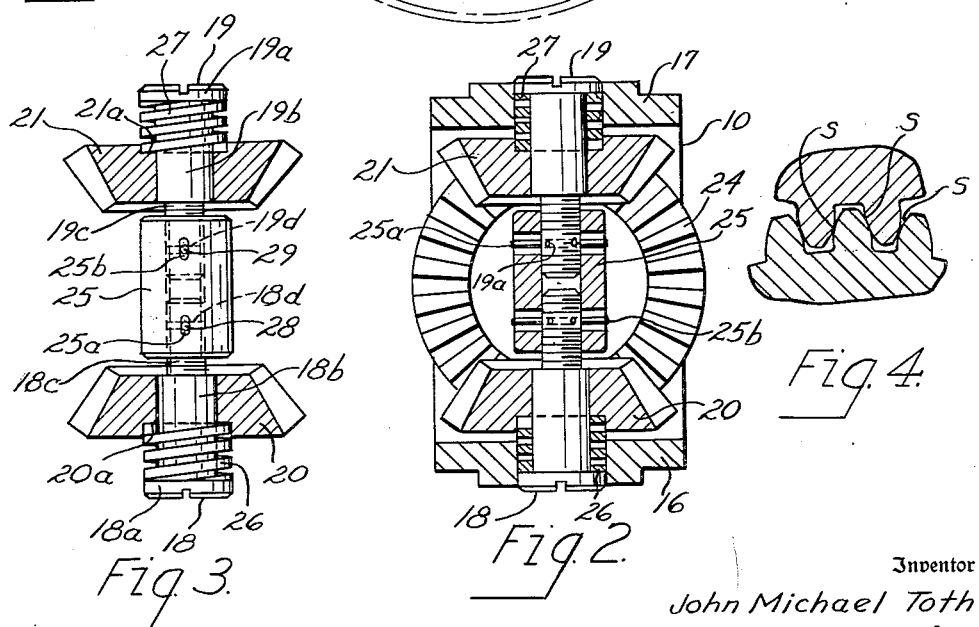
Fig. 2 is a view taken along the line 2—2 of Fig. 1.
Fig. 3 is a detailed view of the spindle upon which the differential pinions are mounted.
Fig. 4 is a section taken along the line 4—4 of Fig. 1.

Referring now particularly to Fig. 3, it will be noted that the spindles 18—19 are provided with enlarged heads 18a—19a, non-threaded journal portions 18b—19b, of relatively smaller diameter than the head, upon which the differential pinions 20 and 21 are journaled, and still further diametrically reduced threaded ends 18c—19c. It will also be noted that the differential pinions 20 and 21 are centrally recessed at 20a and 21a respectively to receive heavy coiled springs 26 and 27 interposed between said recesses and the heads 18a—19a.

The coiled springs 26 are of rectangular cross section and are preferably of a relatively heavy wire size. For example, a 3/16" x 5/32" wire spring having a diameter of 1⅛" has proved to be quite satisfactory. This spring size, when wound to 3¼ coils per inch of free length has a load gradient of 95–100 lbs. per 1/16" of compression.

The threaded ends 18c—19c are thread fitted into a single, tapped block 25 made of metal or other suitable material and interposed longitudinally between the pinions 20 and 21. Said block 25 is longitudinally slotted at 25a and 25b and the threaded ends 18c—19c of the spindles are transversely apertured at 18d—19d whereby cotter pins 28 and 29 respectively may be inserted through said slots and said transverse apertures to hold the block 25 in any adjusted position. The spindle 18 is provided with a plurality of the transverse apertures 18d circumferentially interspaced and intersecting in a single plane whereby said spindle may be adjusted in small, fractional turns, and the spindle 19 is similarly provided with the apertures 19d.

As best shown in Figs. 1 and 2, it will be noted that the spindle heads 18a—19a and the springs 26 and 27 are adapted to complementarily interfit the apertures 16a and 17a respectively. It will also be noted that the springs 26—27 are of rectangular cross-section and snugly but rotatably fit upon the journals 18b—19b. The spindles 18—19 can, therefore, be tightened within the block 25 by rotating the heads 18a—19a, but there is no lost motion between said spindles and the differential housing 10. By tightening the spindles, the differential pinions are brought into tighter, resilient mesh with the intermediate gears 23—24, and the spring biased pinions 20—21 also exert wedging action between the side gears 23—24. This wedging action causes the side gears 23—24 to be pressed against the differential housing 10 thereby contributing to the resistance to differential action of the device. Also contributing to the resistance to differential action is the resistance to rotation of the pinions 20—21 themselves caused by the substantial drag of the springs 26—27 on their outer surfaces. Regardless of which spindle is tightened, the mesh between pinions and gears will be equalized since the spindles and block 25 are free to move longitudinally and will automatically center themselves.

The oppositely applied pressures of the differential pinions 20—21 effectively resist differential action of the mechanism whereby torque is transmitted to both of the vehicle's wheels even when one of them is on a slippery surface. The torque applied to the wheel having the greatest traction is sufficient to propel the vehicle away from slippery surfaces under practically all adverse driving conditions when the mechanism is properly adjusted.

When driving on dry roads, normal differential action takes place due to the weight of the vehicle giving sufficient traction to offset the resistance to such differential action. This does not, however, cause any damage or excessive wear to the differential pinions and gears because said pinions are resiliently biased into mesh with the intermediate gears and can adjust themselves to perfect alignment therewith. As well shown in Fig. 4, properly formed gear teeth are adapted for rolling contact along their concave surfaces S and will not bind unless rigidly mounted. The spring biasing of the pinions in the present device obviates the danger of binding and insures a perfect mesh of the gears at all times.

In Figs. 5 to 7 inclusive I show a modified form of the device of Figs. 1 to 4 wherein I provide a single spindle shaft 30 for the differential pinions and a different arrangement for mounting the pinion biasing springs. It will be understood that all other parts remain identical with corresponding parts in the first embodiment and will be referred to by identical reference characters. New reference characters are given to those parts which are modified in form or replaced by substitutes.

Referring now to Figs. 5 and 6, the spindle shaft 30 extends across the differential housing 10 and is retained by means of cups 31 and 32 thread fitted into threaded apertures 16a' and 17a' in the end walls 16' and 17' respectively of said housing. The springs 26 and 27 are slidably telescoped into sockets 31a and 32a of the cups 31 and 32 at the outwardly directed ends of said springs, the inner ends of said springs being seated within the recesses 20a and 21a of the pinions 20 and 21 respectively. The ends of the spindle shaft 30 slidably interfit the springs 26—27, and in normal adjustment are spaced slightly from the bottom walls 31b—32b of the cups 31—32.

An apertured spacer block 35 is telescoped over the spindle shaft 30 and interposed between the differential pinions 20 and 21. The aperture of said spacer block, shown at 36 in Fig. 7, is oblong in section having a transverse dimension at right angles to the axle shafts such as to slidably interfit the spindle shaft 30 and having its longer dimension parallel with the axes of said axle shafts. In this embodiment, the axles 3' and 4' extend inwardly to abut the spacer block 35, and it will be readily seen that any longitudinal movement or shift of said axles will not affect the spindle shaft 30 due to the oblong aperture 36 which allows said block to move relative to said spindle shaft. It will also be noted that the spacer block 35 is spaced slightly from the differential pinions 20 and 21 to allow said pinions to move inwardly.

It will be understood that by turning the cups 31—32 in the threaded apertures 16a'—17a', resilient tension upon the pinions 20—21 may be increased or decreased thus enabling the modification of Figs. 5–7 to function in a manner similar to the first embodiment. Very little tightening of the cups is necessary to attain the desired tension due to the extreme strength of the springs 26 and 27. Normally, a fraction of a turn would be sufficient. For this reason, the end play necessary for the spindle shaft 30 and the spacer block 35 is very small, and due to the fact that the entire differential unit is immersed in heavy lubricant, no objectionable vibrating of these parts results. However, I anticipate that these spaces could be substantially increased and provided with suitable cushioning means such as light springs or resilient pads abutting the ends of the spindle shaft and the ends of the spacer block to maintain them in a centralized position.

In operation, the drive shaft 5 and the drive pinion 6 are rotated by the vehicle engine (not herein illustrated). Said drive pinion rotates the ring gear 14 which causes the differential housing 10 to rotate. The spindle shafts (18—19, or 30) rotate with the housing 10 to which they are mounted at the apertures 16a—17a or 16a'—17a'. Under normally good driving conditions, normal differential action takes place when turning corners whereby one axle is caused to rotate faster than the other in a conventional manner. However, when one wheel begins to slip or lose traction, the normal differential action is sufficiently resisted by the inwardly biased differential pinions 20 and 21 and by the wedging action of the spring biased pinions 20—21 between the side gears 23—24 and by the resistance to rotation of the pinions themselves 20—21, caused by the substantial drag of the springs 26—27 on their outer surfaces to retard the spinning wheel and transfer driving torque to the opposite wheel. This transfer of driving torque is instantaneous under all driving conditions due to the fact that the retarding mechanism is effective at all times. On bumpy roads where the vehicle's wheels tend to alternately bounce above the surface of the roadway, the tendency of the raised wheel to spin is resisted whereas the opposite wheel maintains traction. This results in greater stability or roadability of the vehicle. Similarly and of even greater importance, the present device tends to equalize driving torque to wheels in such a way as to effectively offset the vehicle's tendency to fishtail on ice or other slippery surfaces, especially when one wheel has more traction than the other.

It will be understood that many departures from the details of my invention as it is herein described and illustrated may be made, such as changes in size and dimension, without, however, departing from the spirit of my invention or the scope of the appended claims.

What I claim is:

1. A differential mechanism of the type having a rotatable differential housing, aligned axle shafts projecting into said housing from opposite directions coaxially with the axis of said housing and having intermediate gears mounted thereupon inside said housing, differential pinions mounted upon spindle means disposed at right angles to and intersecting the axis of said axle shafts, said differential pinions meshing with said intermediate gears to differentially drive said axle shafts, said spindle means mounted for endwise movement within said differential housing, and spring means associated with said spindle means and said housing adapted to exert resilient pressure upon said differential pinions to urge the same into tighter mesh with said intermediate gears.

2. A differential mechanism of the type having a rotatable differential housing, aligned axle shafts projecting into said housing from opposite directions coaxially with the axis of said housing and having intermediate gears mounted thereupon inside said housing, a pair of coaxial, differential pinions mounted upon spindle means disposed at right angles to and intersecting the axis of said axle shafts, said differential pinions meshing with said intermediate gears to differentially drive said axle shafts, said spindle means comprising a pair of coaxial spindle shafts axially movably mounted within said differential housing, said spindle shafts having enlarged, outwardly directed end portions and reduced, threaded, inwardly directed end portions, a tapped block adapted to receive said threaded end portions whereby said spindle means is longitudinally adjustable, and spring means interposed between said enlarged end portions of said spindle shafts and said differential pinions whereby said differential pinions are adjustably, resiliently urged into mesh with said intermediate gears to inhibit differential action therebetween.

3. A differential mechanism of the type having a rotatable differential housing, aligned axle shafts projecting into said housing from opposite directions coaxially with the axis of said housing and having intermediate gears mounted thereupon inside said housing, differential pinions mounted upon spindle means disposed at right angles to and intersecting the axis of said axle shafts, said differential pinions meshing with said intermediate gears to differentially drive said axle shafts, said spindle means mounted for endwise movement within said differential housing and said pinions mounted for endwise and rotative movement upon said spindle means, and spring means associated with said spindle means and said differential housing to form bearing means for said spindle means and to resiliently urge said differential pinions into mesh with said intermediate gears.

4. A differential mechanism of the type having a rotatable differential housing, aligned axle shafts projecting into said housing from opposite directions coaxially with the axis of said housing and having intermediate gears mounted thereupon inside said housing, differential pinions mounted upon spindle means disposed at right angles to and intersecting the axis of said axle shafts, said differential pinions meshing with said intermediate gears to differentially drive said axle shafts, said spindle means comprising separate spindle shafts upon each of which one of said pinions is rotatably mounted, said spindle shafts projecting through said differential housing at the outer ends thereof, a block member centrally disposed between said pinions, said spindle shafts having inwardly directed, threaded end portions thread fitted within said block member, and spring means mounted upon said spindle shafts exerting inward resilient pressure upon said pinions to urge the same into mesh with said intermediate gears to inhibit differential action between said pinions and said intermediate gears.

5. A differential mechanism of the type having a rotatable differential housing, aligned axle shafts projecting into said housing from opposite directions coaxially with the axis of said housing and having intermediate gears mounted thereupon inside said housing, differential pinions rotatably mounted upon a spindle shaft disposed at right angles to and intersecting the axis of said axle shafts whereby said pinions mesh with said intermediate gears to differentially drive said axle shafts, externally threaded cup members thread fitted into said differential housing and encompassing the ends of said spindle shaft, coiled springs telescoped over said spindle shaft and interposed between said cup members and said pinions and exerting resilient pressure upon said pinions to cause them to tightly intermesh with said intermediate gears, said springs adapted to serve as bearing means between said spindle shaft and said cups.

References Cited in the file of this patent

UNITED STATES PATENTS

| | | |
|---|---|---|
| 1,867,678 | Rayburn | July 19, 1932 |
| 2,354,214 | Lockwood | July 25, 1944 |
| 2,459,870 | Cook | Jan. 25, 1949 |

FOREIGN PATENTS

| | | |
|---|---|---|
| 469,737 | France | May 27, 1914 |
| 430,128 | Italy | Feb. 9, 1948 |

UNITED STATES PATENT OFFICE

CERTIFICATE OF CORRECTION

Patent No. 2,985,035 May 23, 1961

John Michael Toth

It is hereby certified that error appears in the above numbered patent requiring correction and that the said Letters Patent should read as corrected below.

Column 1, lines 19 and 20, for "filed August 20, 1958" read -- filed August 20, 1953 --.

Signed and sealed this 10th day of October 1961.

(SEAL)
Attest:

ERNEST W. SWIDER
Attesting Officer

DAVID L. LADD
Commissioner of Patents
USCOMM-DC